US012764284B2

(12) United States Patent
Zhao et al.

(10) Patent No.: US 12,764,284 B2

(45) Date of Patent: Oct. 13, 2026

(54) SYSTEMS AND METHODS FOR ENHANCED SEMI DECOUPLED PARTITIONING

(71) Applicant: Tencent America LLC, Palo Alto, CA (US)

(72) Inventors: Liang Zhao, Palo Alto, CA (US); Xin Zhao, Palo Alto, CA (US); Madhu Peringassery Krishnan, Palo Alto, CA (US); Jing Ye, Palo Alto, CA (US); Han Gao, Palo Alto, CA (US); Yushin Cho, Palo Alto, CA (US); Tianqi Liu, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/786,323

(22) Filed: Jul. 26, 2024

(65) Prior Publication Data

US 2025/0280121 A1 Sep. 4, 2025

Related U.S. Application Data

(60) Provisional application No. 63/560,551, filed on Mar. 1, 2024.

(51) Int. Cl.

*H04N 19/119* (2014.01)
*H04N 19/176* (2014.01)

(Continued)

(52) U.S. Cl.

CPC ......... *H04N 19/119* (2014.11); *H04N 19/176* (2014.11); *H04N 19/186* (2014.11); *H04N 19/70* (2014.11); *H04N 19/96* (2014.11)

(58) Field of Classification Search

CPC .. H04N 19/119; H04N 19/176; H04N 19/186; H04N 19/70; H04N 19/96

(Continued)

(56) References Cited

U.S. PATENT DOCUMENTS

2021/0235079 A1 7/2021 Chuang et al.
2021/0314630 A1* 10/2021 Misra .................... H04N 19/96

(Continued)

FOREIGN PATENT DOCUMENTS

WO WO 2023072262 A2 5/2023

OTHER PUBLICATIONS

Zhao et al., "Semi-Decoupled Partitioning for Video Coding Beyond AV1", 2021 IEEE International Conference on Image Processing (ICIP), Sep. 2021. (Year: 2021).*

(Continued)

*Primary Examiner* — Matthew K Kwan

(74) *Attorney, Agent, or Firm* — Morgan, Lewis & Bockius LLP

(57) ABSTRACT

An example video decoding method includes receiving a video bitstream comprising a plurality of blocks. The method includes, when the plurality of blocks includes a first block that satisfies a first block size: (i) before a first partitioning threshold, partitioning a luma component of the first block and a chroma component of the first block with a same partitioning; (ii) beyond the first partitioning threshold, independently partitioning the luma component and the chroma component; and (iii) when the chroma component is determined to share one or more partitioning properties with the luma component at the first partitioning threshold, partitioning, at the first partitioning threshold, the chroma component and the luma component using the one or more partitioning properties.

20 Claims, 7 Drawing Sheets

(51) Int. Cl.
*H04N 19/186* (2014.01)
*H04N 19/70* (2014.01)
*H04N 19/96* (2014.01)

(58) Field of Classification Search
USPC ..................................................... 375/240.24
See application file for complete search history.

(56) References Cited

U.S. PATENT DOCUMENTS

| | | | | |
|---|---|---|---|---|
| 2022/0086439 | A1 | 3/2022 | Tsai et al. | |
| 2022/0286675 | A1 | 9/2022 | Zhao et al. | |
| 2022/0295048 | A1 | 9/2022 | Esenlik et al. | |
| 2024/0305824 | A1* | 9/2024 | Deng ..................... | H04N 19/52 |

OTHER PUBLICATIONS

Liang Zhao et al., "Semi-Decoupled Partitioning for Video Coding Beyond AV1", 2021 IEEE International Conference on Image Processing (ICIP), Sep. 2021, 5 pgs.
Peter de Rivas et al., "AVI Bitstream & Decoding Process Specification", Version 1.0.0 with Errata 1, Alliance for Open Media, Codec Working Group, Jan. 2018, 681 pgs., Retrieved from the Internet: https://aomediacodec.github.io/avl-spec/avl-spec.pdf.
Tencent America LLC, ISRWO, PCT/US2024/040234, Oct. 18, 2024, 19 pgs.

* cited by examiner

SYSTEMS AND METHODS FOR ENHANCED SEMI DECOUPLED PARTITIONING

RELATED APPLICATIONS

This application claims priority to U.S. Provisional Patent Application No. 63/560,551, entitled "Enhancement for Semi Decoupled Partitioning," filed Mar. 1, 2024, which is hereby incorporated by reference in its entirety.

TECHNICAL FIELD

The disclosed embodiments relate generally to video coding, including but not limited to systems and methods for coding chroma blocks and luma blocks using semi decoupled partitioning (SDP).

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to semi decoupled partitioning (SDP) of chroma blocks and luma blocks. Some embodiments disclose luma and chroma blocks sharing the same partitioning information before a first partitioning threshold and independently partitioning the luma component and the chroma component beyond the first partitioning threshold. An advantage of SDP includes improved coding gain efficiency (e.g., reduced signaling cost for the shared partitioning portion and improved accuracy for the different partitioning portion). When luma and chroma components have the different block partitioning, the coding flexibility is largest (e.g., the accuracy is the highest) but at the expense of long hardware latency. For example, a luma component may need to be fully decoded before the chroma component may be decoded. The disclosed implementations retain the coding gain efficiency of independent partitioning (for smaller blocks) and also reduces the hardware latency issues by using the same partitioning for the larger blocks. For example, by enforcing the luma and chroma blocks to have the same block partitioning (e.g., at the largest block level), luma and chroma components can be processed in parallel thus achieving reduced hardware latency.

In accordance with some embodiments, a method of video decoding is provided. The method includes (i) receiving a video bitstream (e.g., a coded video sequence) comprising a plurality of blocks (e.g., corresponding to one or more pictures); and (ii) when the plurality of blocks includes a first block that satisfies a first block size (e.g., at least 128×128 samples): (a) before a first partitioning threshold (e.g., when the partitioning depth is less than the threshold value), partitioning a luma component of the first block and a chroma component of the first block with a same partitioning; (b) beyond the first partitioning threshold (e.g., when the partitioning depth is greater than the threshold value), independently partitioning the luma component and the chroma component; and (c) when the chroma component is determined to share one or more partitioning properties with the luma component at the first partitioning threshold (e.g., when the partitioning depth is equal to the threshold value), partitioning, at the first partitioning threshold, the chroma component and the luma component using the one or more (shared) partitioning properties.

In accordance with some embodiments, a method of video encoding is provided. The method includes (i) receiving video data (e.g., a source video sequence or a coded video sequence) comprising a plurality of blocks (e.g., corresponding to one or more pictures); (ii) when the plurality of blocks includes a first block that satisfies a first block size (e.g., at least 128×128 samples): (a) before a first partitioning threshold, partitioning a luma component of the first block and a chroma component of the first block with a same partitioning; (b) beyond the first partitioning threshold, independently partitioning the luma component and the chroma component; and (c) when the chroma component is determined to share one or more partitioning properties with the luma component at the first partitioning threshold, partitioning, at the first partitioning threshold, the chroma component and the luma component using the one or more partitioning properties.

In accordance with some embodiments, a method of processing visual media data includes: (i) obtaining a source video sequence that comprises a plurality of frames; and (ii) performing a conversion between the source video sequence and a video bitstream of visual media data according to a format rule. The video bitstream comprises a plurality of encoded blocks corresponding to the plurality of frames, the plurality of encoded blocks including a first block having a luma component and a chroma component. The format rule specifies that: (a) before a first partitioning threshold, the luma component and the chroma component are to be partitioned with a same partitioning; (b) beyond the first partitioning threshold, the luma component and the chroma component are to be independently partitioned; and (c) when the chroma component is determined to share one or more partitioning properties with the luma component at the first partitioning threshold, the chroma component and the luma component are to be partitioned at the first partitioning threshold using the one or more partitioning properties.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes video/image compression techniques including applying SDP to a chroma component and a luma component of a block when a super block or coding tree unit size satisfies a block size (e.g., has a height and/or width that is greater than 64, 128, 256, or 512 samples). Before a first partitioning threshold, the luma component and the chroma component are partitioned with the same partitioning (e.g., the partitioning parameters signaled/derived for the luma component are used for a chroma component as well). Beyond the first partitioning threshold, the luma component and the chroma component are independently partitioned (e.g., may or may not have the same partitioning parameters). When the chroma component is determined to share one or more partitioning properties (e.g., a subset of all of the partitioning properties) with the luma component at the first partitioning threshold, the chroma component and the luma component are partitioned using the one or more partitioning properties at the first partitioning threshold.

With SDP, luma and chroma share the same coding block partitioning toward a specified partitioning depth. After this specified depth, the partitioning patterns of luma and chroma components can be optimized and signaled independently. A benefit of SDP is the additional flexibility of switching between dependent and independent partitioning patterns for luma and chroma since the characteristics of these color components can largely differ. Thus, an advantage of using SDP is reduced overhead (e.g., less coding operations and bandwidth are required) by enforcing the luma and chroma blocks to have the same block partitioning before the first partitioning threshold. An advantage of having the same partitioning before the threshold is reduced signaling and/or deriving requirements (e.g., but coding accuracy may be reduced). An advantage of having independent partitioning after the threshold is improved coding accuracy (e.g., but with increased hardware latency). For example, flexible block partitioning between luma and chroma blocks fits the object boundaries in different channels with better adaptivity. An advantage of sharing partitioning parameters at the threshold is reduced signaling (e.g., while maintaining coding accuracy). In this way, applying the enhanced SPD with the threshold increases/maintains coding accuracy while reducing hardware latency. Table 1 below illustrates the improvements to encoding and decoding time based on simulations performed using current designs (e.g., AVM design v6) with various video data (e.g., representing AOM Common Test Conditions v6.0).

TABLE 1

Simulation Results

| | Y-PSNR | U-PSNR | V-PSNR | YUV-PSNR | Enc-time | Dec-time |
|---|---|---|---|---|---|---|
| All Intra | 0.17% | 0.40% | 0.63% | 0.20% | 98% | 99% |
| Random Access | 0.03% | 0.12% | 0.22% | 0.05% | 100% | 100% |
| Low Delay | 0.00% | 0.49% | 0.09% | 0.02% | 100% | 99% |

Example Systems and Devices

Figure 1:
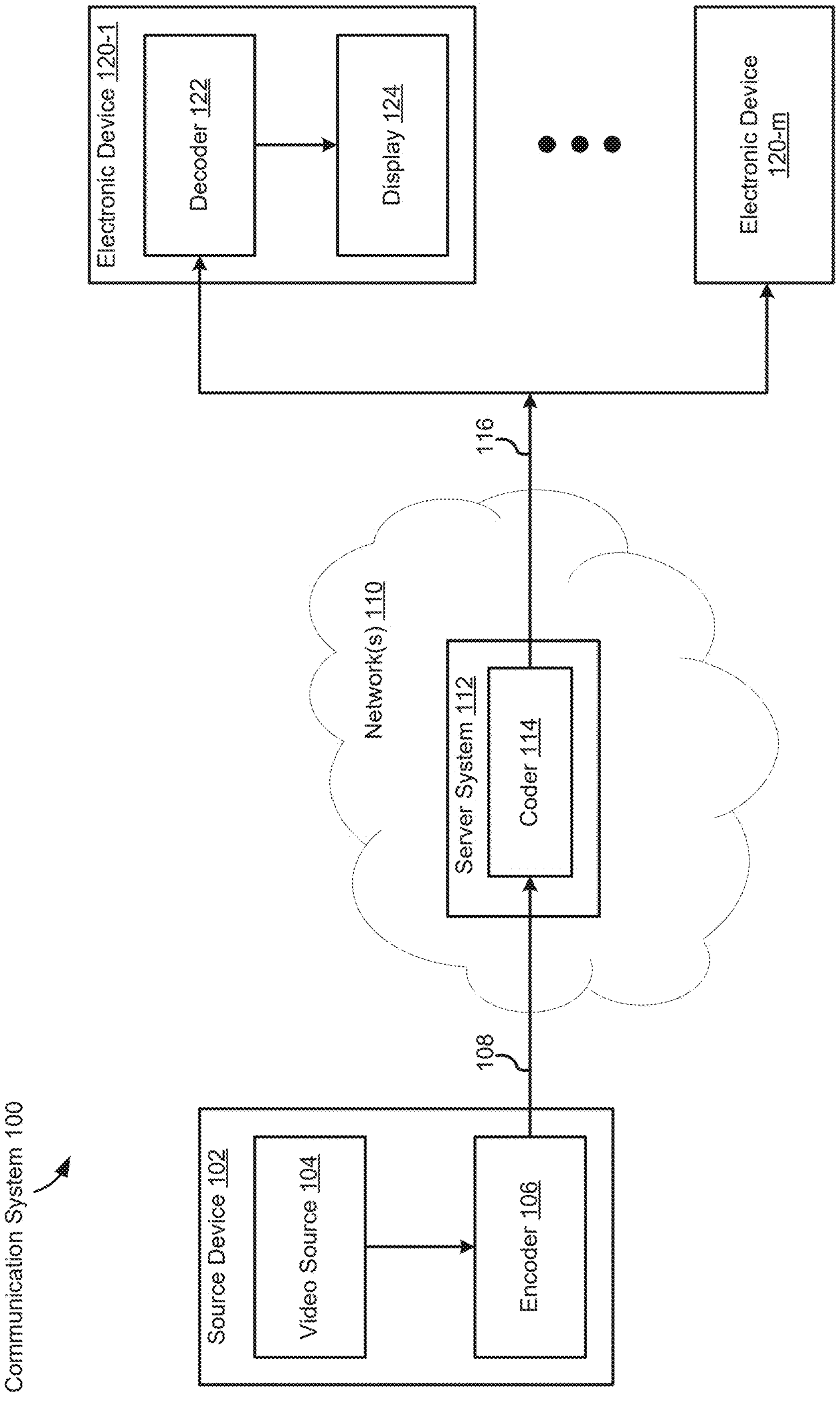
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device **120-*m*) that are communicatively coupled to one another via one or more networks. In some embodiments, the communication system 100** is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

Figure 2A:
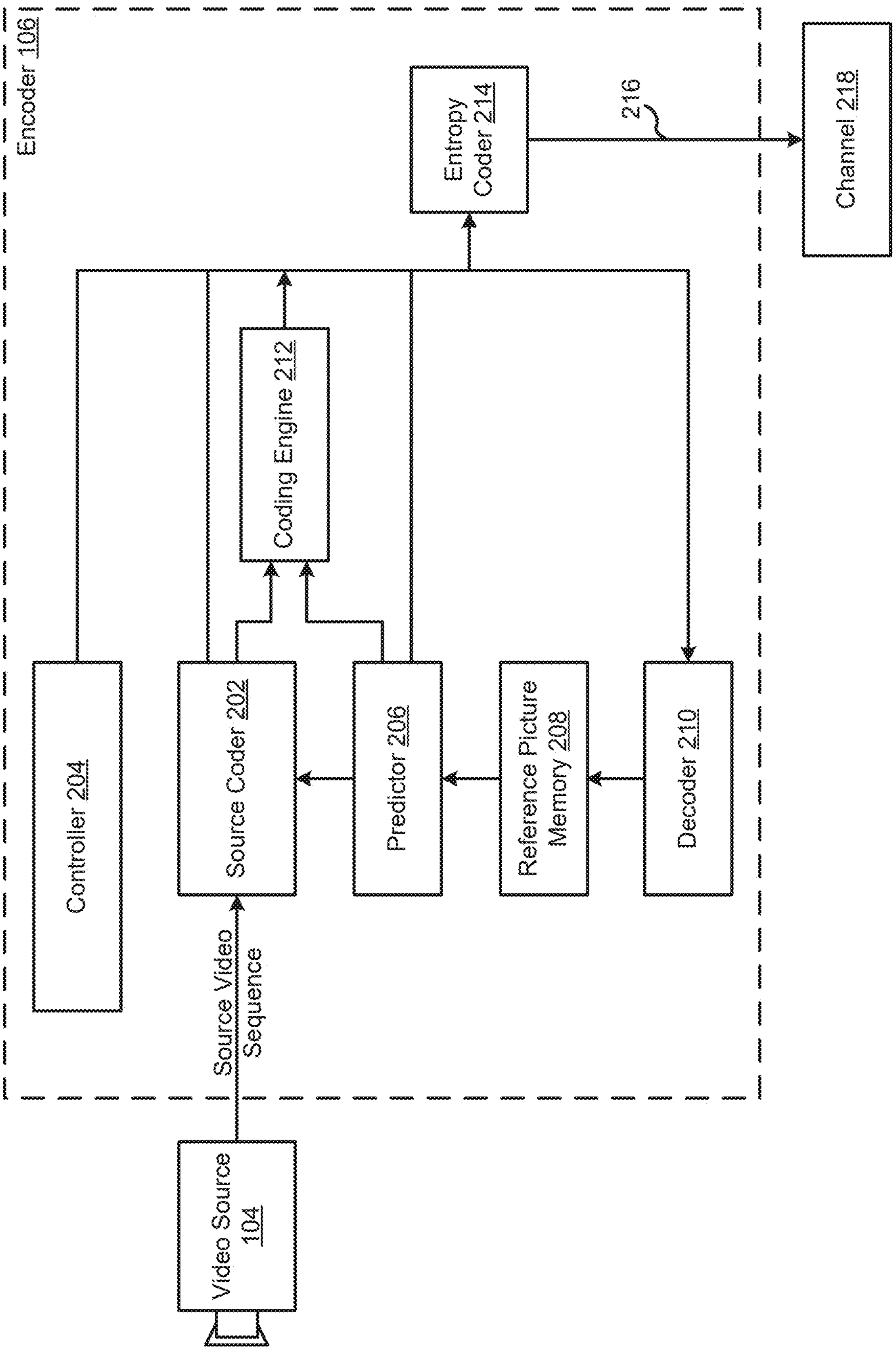
FIG. 2A is a block diagram illustrating example elements of an encoder component in accordance with some embodiments.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
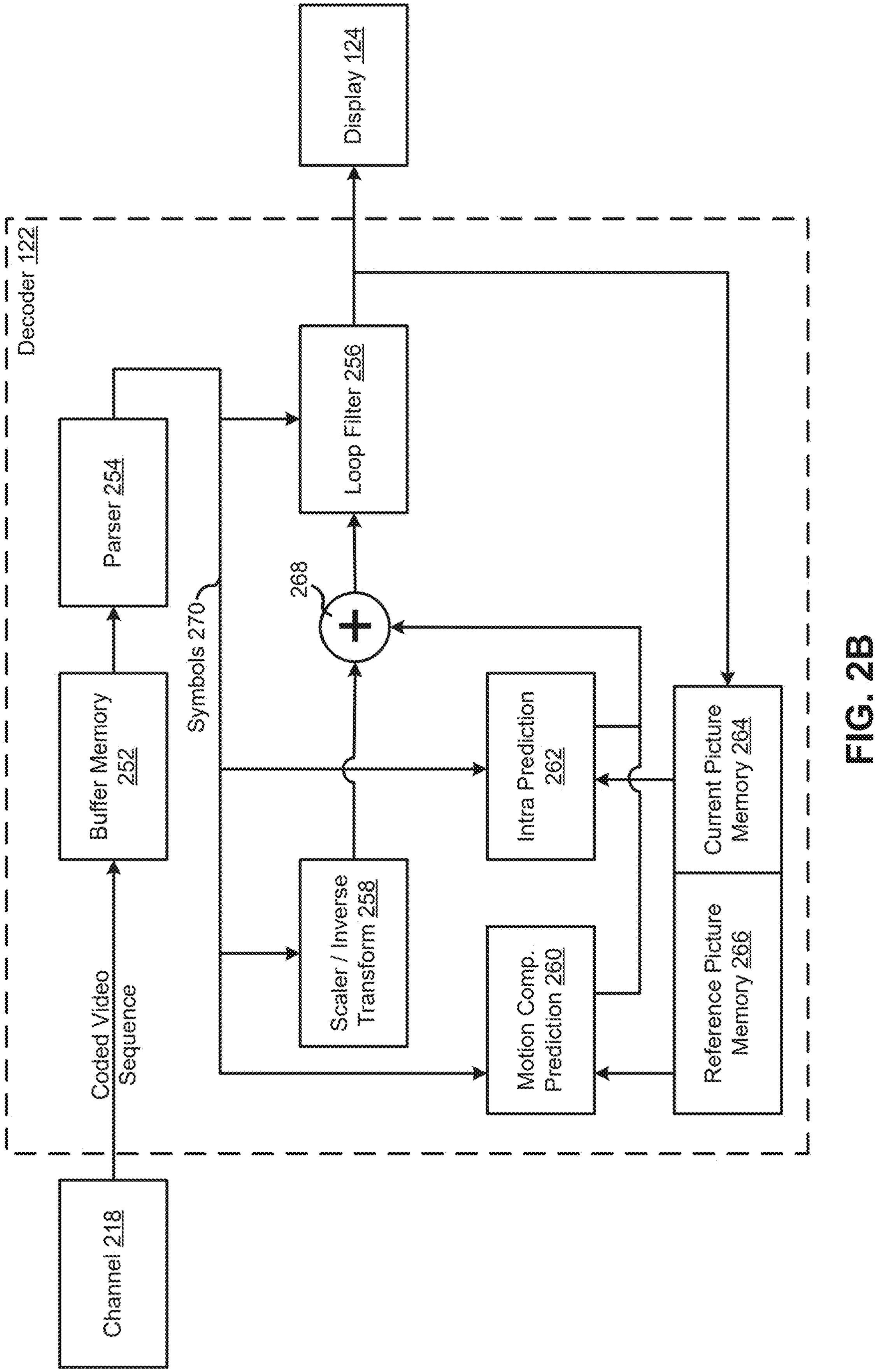
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
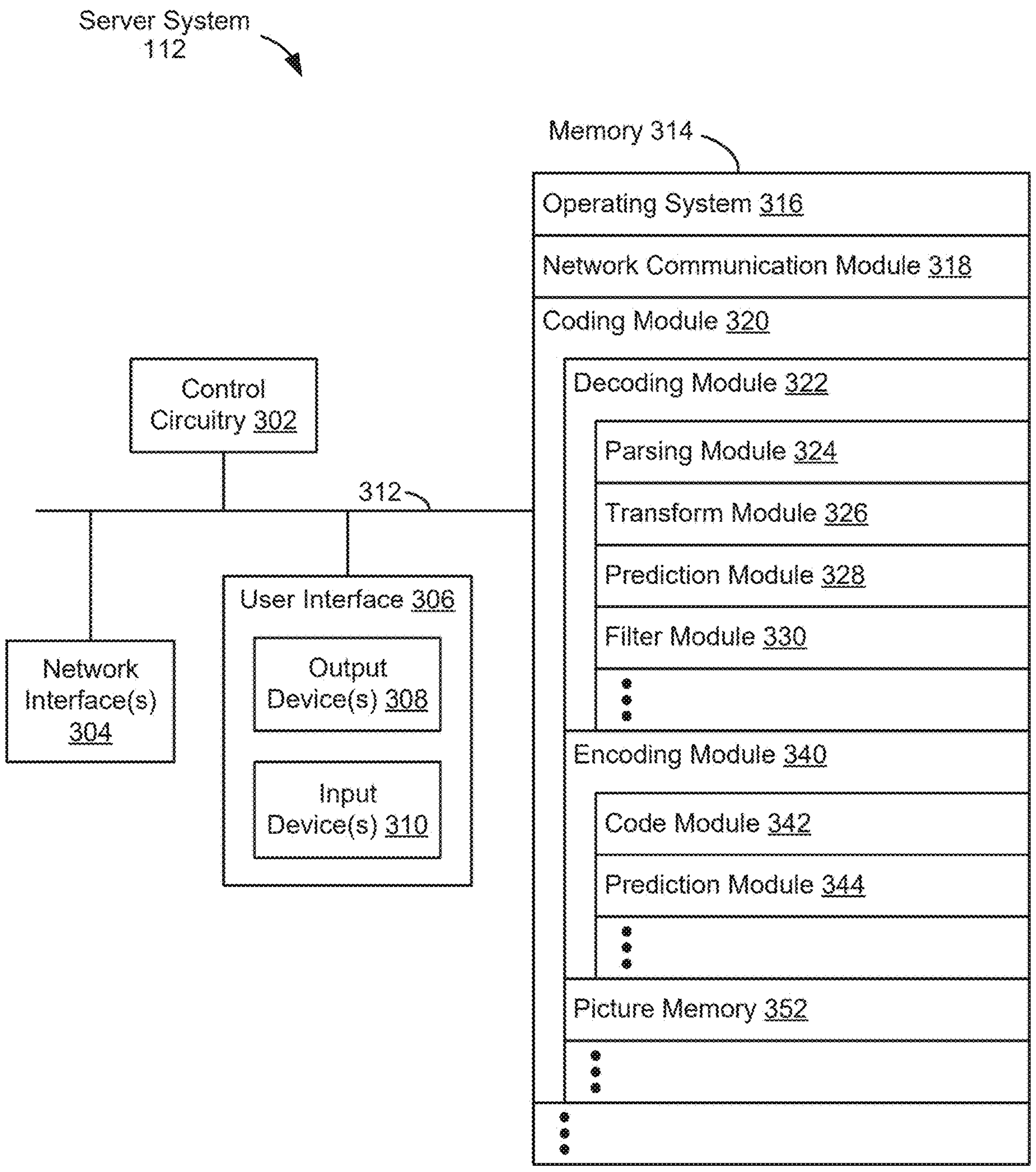
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). As used herein, a block (or sub-block) refers to a coding block (such as a super block, largest coding unit, or coding tree block), a prediction block, a transform block, or a filtering unit. As an example, a sub-block of a block A refers to a block whose area is fully contained in the block A. A block region refers to a block area that contains one or more blocks (e.g., having a same prediction mode).

Turning to block partitioning for coding and decoding, general partitioning may start from a base block (e.g., a super block or root node) and may follow a predefined ruleset, partition structure, and/or scheme. The partitioning may be hierarchical and recursive. After dividing or partitioning a base block using any of the example partitioning procedures or other procedures described below, or the combination thereof, a final set of partitions or coding blocks (e.g., leaf blocks) may be obtained. Each of these partitions may be at one of various partitioning levels in the partitioning hierarchy, and may be of various shapes. Each of the partitions may be referred to as a coding block (CB), such partitions are referred to as coding blocks because they may form units for which some basic coding/decoding decisions may be made and coding/decoding parameters may be optimized, determined, and signaled in an encoded video bitstream. The highest (or deepest) level in the final partitions represents the depth of the coding block partitioning structure of a tree.

A coding block may be a luma coding block or a chroma coding block. The hierarchical structure of for all color channels may be collectively referred to as coding tree unit (CTU). The partitioning patterns or structures for the various color channels in a CTU may or may not be the same. In some embodiments, partition tree schemes or structures used for the luma and chroma channels may not be the same (luma and chroma channels may have separate coding tree structures). When separate coding partition tree structures or modes are applied, a luma channel may be partitioned into luma CBs by one coding partition tree structure, and a chroma channel may be partitioned into chroma CBs by another coding partition tree structure. In some embodiments of a partitioning structure, the CTU size may be set as 128×128 luma samples with two corresponding 64×64 blocks of chroma samples (when an example chroma subsampling is considered and used).

A region, or coding region, can refer to any level in any one of the partitioning schemes described above or in any other partitioning schemes not specifically described above. A region may be a frame, a slice, a super block, a macroblock, a sub-block, or a prediction block. For example, a region may be any partitioning level of a recursive partitioning scheme. A region may be at a leaf level or non-leaf level of a particular partitioning scheme. A leaf level region is a region that is not further partitioned. A non-leaf level region, on the other hand, is further partitioned into at least two child regions, each of which may be at a leaf level or may be at a non-leaf level and thus may be further partitioned. A leaf level region is predicted in whole using a particular prediction mode. For example, a leaf-level region may be either inter coded or intra coded. Optionally, a leaf level region may additionally be intra-inter coded if intra-inter prediction mode is permitted. An intra-inter coding mode refers to a coding mode that generates a prediction block using both intra prediction and inter prediction methods. For example, a prediction mode that derives the prediction block as a weighted sum of an intra prediction block and an inter prediction block.

Figure 4A:
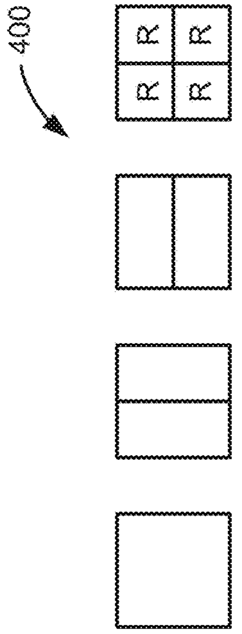
FIGS. 4A-4D illustrate example coding tree structures in accordance with some embodiments.
Figure 4B:
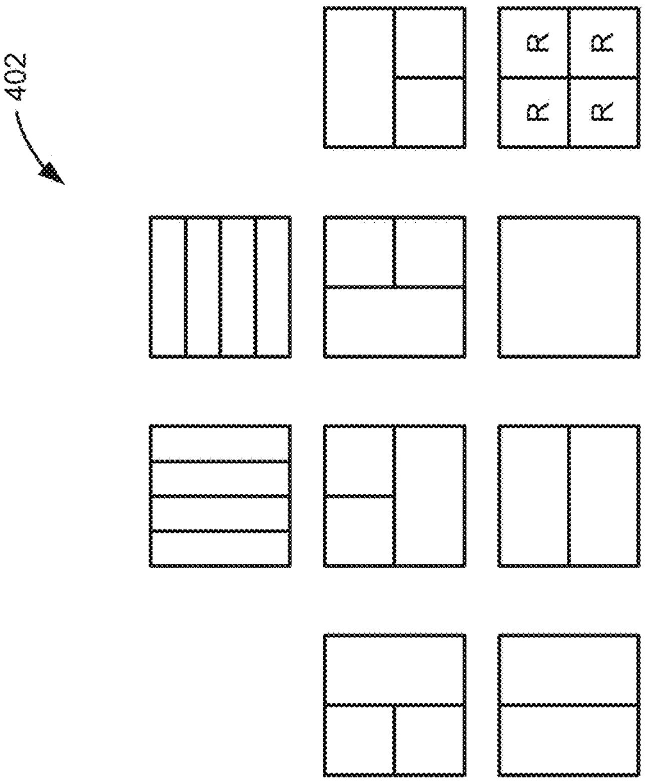
Figure 4C:
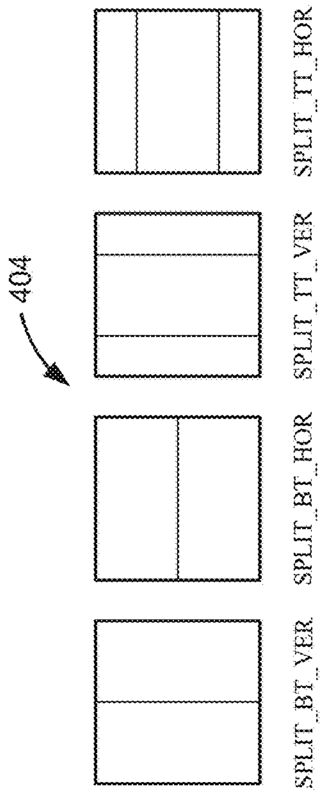

FIGS. 4A-4D illustrate example coding tree structures in accordance with some embodiments. As shown in a first coding tree structure (400) in FIG. 4A, some coding approaches use a 4-way partition tree starting from a 64×64 level down to a 4×4 level, e.g., with some additional restrictions for blocks 8×8. In FIG. 4A, partitions designated as “R” are recursive in that the same partition tree is repeated at a lower scale until the lowest level is reached. As shown in the example coding tree structure (402) in FIG. 4B, some coding approaches expand the partition tree to a 10-way structure and increase the largest size (e.g., sometimes referred to as a super block) to start from 128×128. The second coding tree structure includes 4:1/1:4 rectangular partitions that are not in the first coding tree structure. The partition types with 3 sub-partitions in the second row of FIG. 4B are referred to as T-type partitions. In addition to a coding block size, coding tree depth can be defined to indicate the splitting depth from the root note.

As an example, a coding tree unit (CTU) may be split into coding units (CUs) by using a quad-tree structure denoted as a coding tree to adapt to various local characteristics. In some embodiments, the decision on whether to code a picture area using inter-picture (temporal) or intra-picture (spatial) prediction is made at the CU level. Each CU can be further split into one, two, or four prediction units (PUs) according to the PU splitting type. Inside a PU, the same prediction process is applied, and the relevant information may be transmitted to the decoder on a PU basis. After obtaining the residual block by applying the prediction process based on the PU splitting type, a CU can be partitioned into transform units (TUs) according to another quad-tree structure like the coding tree for the CU.

Figure 4D:
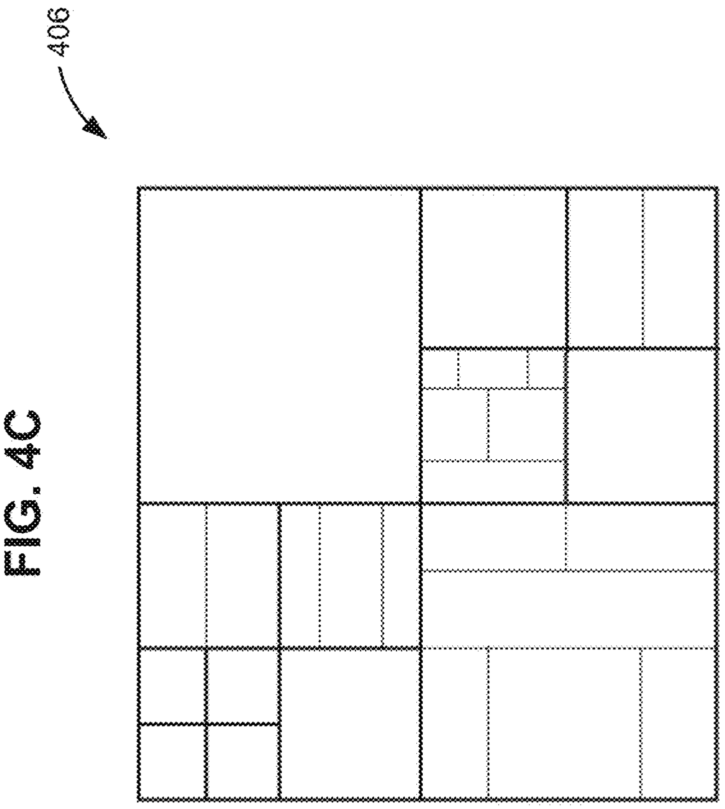

A quad-tree with nested multi-type tree using binary and ternary splits segmentation structure may be used to replace the concepts of multiple partition unit types. In the coding tree structure, a CU can have either a square or rectangular shape. A CTU is first partitioned by a quaternary tree structure. The quaternary tree leaf nodes can be further partitioned by a multi-type tree structure. As shown in a third coding tree structure (404) in FIG. 4C, the multi-type tree structure includes four splitting types. The multi-type tree leaf nodes are called CUs, and unless the CU is too large for the maximum transform length. This means that, the CU, PU, and TU may have the same block size in the quad-tree with a nested multi-type tree coding block structure. An example of block partitions for one CTU (406) is shown in FIG. 4D, which illustrates an example quadtree.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

Turning to semi-decoupled partitioning (SDP), SDP refers to a block region where luma and chroma share the same partitioning information at the first N levels (e.g., depths) of the block partitioning, and have separate block partitioning starting from a partitioning point, sometimes referred to as a “decoupled partitioning point.” In some embodiments, the decoupled partitioning point may be implicitly determined based on the luma block partitioning information.

Figure 5:
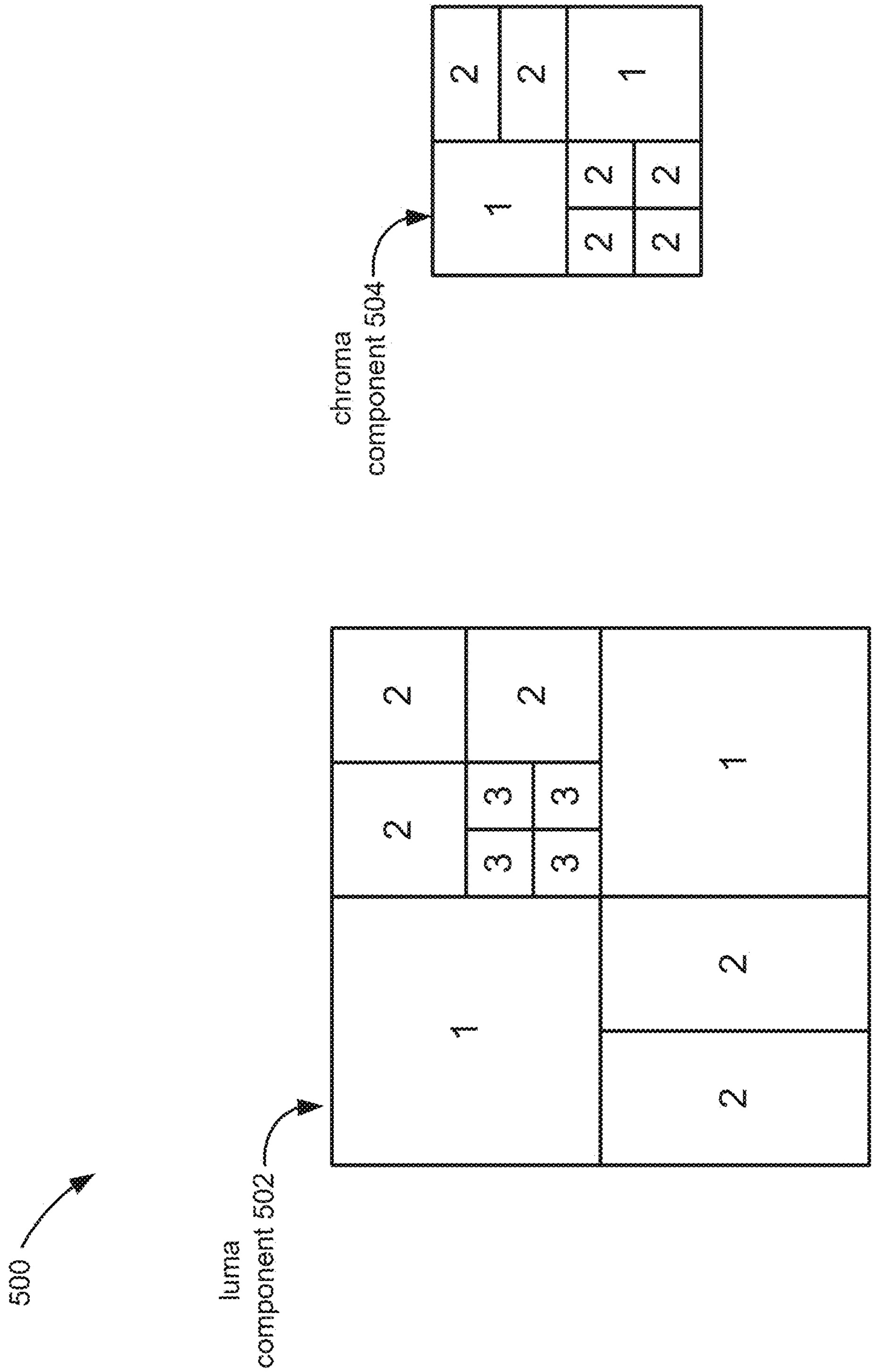
FIG. 5 illustrates coding tree structures of the chroma component and luma component of video data in accordance with some embodiments

An example of semi-decoupled partitioning is shown in FIG. 5. FIG. 5 illustrates a block diagram 500 of an exemplary coding tree structure for video data. The coding tree structure includes a luma component 502 and a chroma component 504. In some embodiments, different chroma color components have separate partitioning (e.g., SDP is used between chroma color components or between the luma component and a single chroma color component). The values within the blocks of the luma component 502 and the chroma component 504 indicate a depth of the block partitioning. In FIG. 5, both luma and chroma share the quad-tree split at the beginning of the super block/coding tree structure. The chroma and luma components start to have separate block partitioning from block partitioning depth 1. In some embodiments, the two color components share more than one partitioning depth (e.g., the partitioning threshold is greater than 1).

In some embodiments, SDP is applied to blocks and/or frames identified as key components of a video sequence. For example, with SDP, luma and chroma components may have different block partitioning starting from 128×128 in key frames (e.g., intra frames). However, in the worst case, the decoding process of chroma blocks needs to wait until the decoding process of the 128×128 luma blocks is finished.

In some embodiments, the chroma block partition is restricted to be the same as the luma block partition until the block size is 64×64 or smaller (e.g., from 128×128 to 64×64), and SDP starts from 64×64. In some embodiments, both the luma and chroma block partitions are implicitly quad tree split from 128×128 to 64×64. In some embodiments, at a super block level, a quad tree split is applied to both the luma and chroma components.

In some embodiments, luma and chroma blocks share the same block partition from 128×128 to 64×64, but luma blocks at the 128×128 partition point have the flexibility to select the best block partitioning type (e.g., from the set of:

PARTITION_NONE, PARTITION_HORZ, PARTITION_VERT, and PARTITION_SPLIT).

In some embodiments, when SDP is enabled, luma and chroma components share the same coding block partitioning toward a specified partitioning depth (shared_depth). Beyond the specified shared_depth, different partitioning patterns can be chosen and signaled for luma and chroma components separately. The value of shared_depth may be derived based on the luma partition size at encoder and decoder, so shared_depth is not signaled into the bitstream. For example, assuming the minimum depth of the luma block is N, then shared_depth between luma and chroma partition may derived as N−1. In addition, the maximum value of shared_depth, denoted as max_shared_depth, can be signaled through high level syntax, e.g., the sequence parameter set, and the value of shared_depth should be clipped to max_shared_depth if the derived shared_depth is greater than max_shared_depth.

In some embodiments, in addition to luma block sizes and coding tree depth of luma blocks, partition types of luma coded blocks may also be employed to determine whether luma or chroma coded blocks in a super block may use the same partitioning or separate partitioning. In some embodiments, when the luma block size is greater than a first partitioning threshold T1, or a coding tree splitting depth of the luma block is smaller than or equal to a second partitioning threshold T2, and/or only quad-tree split (4-way split) may be used for luma block, then the chroma block may use the same coding tree structure as luma. Otherwise, they may use a different coding tree structure. In some embodiments, when the luma block size is greater than a first threshold T1 or a coding tree splitting depth of luma block is smaller than or equal to a second threshold T2, and/or only quad-tree split (4-way split) or binary split (2-way split) may be used for luma block, then chroma block uses the same coding tree structure as the luma block. Otherwise, if the luma block size is less than T1 or the coding tree splitting depth of the luma block is greater than or equal to T2, the chroma blocks and the luma blocks may use different coding tree structures from each other as part of a flexible block partitioning scheme. In some embodiments, when L-type partition or T-type partition may be employed for luma coded block, then luma and chroma coded blocks use different partitioning methods. An L-type block partitioning tree method can split a block into an L-shaped partition and a rectangular partition. Similarly, a T-type block partitioning tree method can split a block into a T-shaped partition and two rectangular partitions.

In some embodiments, when luma and chroma coded blocks in one super block employ different partitioning structures, the partition types allowed for chroma coded blocks are a subset of that allowed for luma coded blocks. In some embodiments, L-type partition or T-type partition may not be allowed for chroma coded blocks when luma coded blocks and chroma coded blocks employ different partition trees from each other. In some embodiments, only quad-tree split (4-way split) and/or binary split (2-way split) may be allowed for chroma coded blocks when luma and chroma coded blocks may employ different partition tree types from each other. In some embodiments, L-type partition may not be allowed to be further split for chroma coded blocks when luma and chroma coded blocks employ different partition tree types from each other. In some embodiments, only quad-tree split (4-way split) or binary split (2-way split) may be further split for chroma coded blocks when luma and chroma coded blocks may employ different partition tree types from each other.

When luma and chroma coded blocks in one super block may employ different tree structure, the tree depth of chroma coded blocks may not exceed the maximum tree depth of the luma coded blocks in this super block. In some embodiments, when luma and chroma coded blocks in one super block employ different partitioning structure, the area sizes of chroma coded blocks cannot be smaller than the minimum area sizes of the luma coded blocks in this super block. In some embodiments, when luma and chroma coded blocks in one super block employ different tree structure, the tree depth of quad-tree split (4-way split) for chroma coded blocks cannot exceed the maximum tree depth of quad-tree split (4-way split) for the luma coded blocks in this super block. In some embodiments, when luma and chroma coded blocks in one super block employ different tree structure, the tree depth of Binary tree (2-way split) plus Triple tree (3-way split) for chroma coded blocks cannot exceed the maximum tree depth of Binary tree (2-way split) plus Triple tree (3-way split) for the luma coded blocks in this super block. In some embodiments, if the chroma block may be partitioned to a depth that may be same of the tree depth of the collocated luma coded block, then partitioning pattern and whether the current chroma block may be to be partitioned will not be signaled.

In some embodiments, in a super block, when a depth of luma coded blocks exceeds a first threshold T1 or the minimum luma block area sizes may be smaller than or equal to another threshold T2, luma and chroma coded blocks may share a partial tree structure. In some embodiments, when the minimum luma block area sizes is smaller than or equal to a threshold T2, the chroma and luma blocks share the top S level tree structure, where T2 and S are both non-negative integers. For example, T2 can be 128 or 256, and S can be 1 or 2. In one example, T2 may be set to 256, and S may be set 1. In another example, the minimum luma coded block may be 16×16, so luma and chroma may share the first level tree depth, and for the tree structure under that point, luma and chroma may have different tree structures.

In some embodiments, for a super block, the condition as to when luma and chroma may start separate tree partitioning may depend on partitioning information of luma. In some embodiments, if luma and chroma have separate tree partitioning structures after the luma (or chroma) block may be split to depth NO, then NO may depend on the partitioning depth (N1) of luma.

In some embodiments, for a super block, the starting point of when luma and chroma may start separate tree partitioning may be signaled in the bitstream. In some embodiments, the starting point of when luma and chroma start separate tree partitioning may be signaled at the super block level, so the starting point of separate trees may be different for different super blocks. The point where the separate tree structures start to differ may be signaled in a high-level syntax of a bitstream. The high-level syntax may include one or more of a sequence header, a frame header, a slice header, etc.

In some embodiments, in a super block, starting from the super block, for each sub-partition, a flag may be signaled to indicate whether the luma and chroma share the same partition tree. If the flag may be signaled as a value that may indicate luma and chroma share the same partition tree, then the chroma may not signal additional partitioning information. Otherwise, for the chroma component, the partitioning information may be further signaled.

Figure 6A:
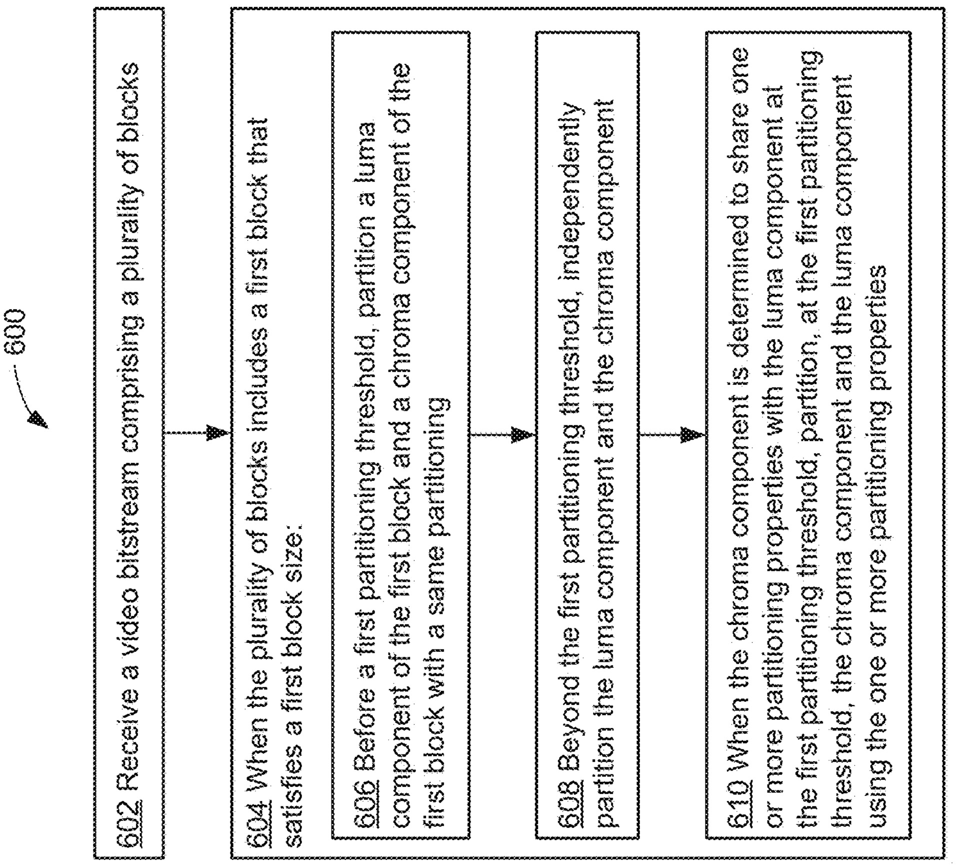
FIG. 6A illustrates an example video decoding process in accordance with some embodiments.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream (e.g., a coded video sequence) comprising a plurality of blocks (e.g., corresponding to one or more pictures). When the plurality of blocks includes a first block that satisfies (604) a first block size (e.g., having a height or width that is greater than a threshold, such as 64 samples, 128 samples, 256 samples, etc.): the system, before a first partitioning threshold (e.g., a first partitioning point), partitions (606) a luma component of the first block and a chroma component of the first block with a same partitioning. The system, beyond the first partitioning threshold, independently (e.g., separately) partitions (608) the luma component and the chroma component (e.g., using one or more partitioning parameters that may be the same or different from one another). When (e.g., in accordance with a determination that) the chroma component is determined to share one or more partitioning properties (e.g., partitioning type, split flag, and/or partitioning direction) with the luma component at the first partitioning threshold, the system partitions (610), at the first partitioning threshold, the chroma component and the luma component using the one or more (shared) partitioning properties.

In some embodiments, when a super block or coding tree unit size is greater than or equal to a first block size, a co-located chroma block is enforced to share the block partitioning with a luma block until the first block partitioning point (P1). Starting from that partitioning point (or block size), chroma has flexibility on whether to share the same partitioning or not. In some embodiments, chroma may still share the same block partitioning type or partitioning direction or split flag with luma until the second block partitioning point (P2). After P2, chroma has separate block partitioning with its co-located luma block (e.g., chroma is partitioned independently of the co-located luma block).

In some embodiments, the partitioning points P1 and P2 are same. In some embodiments, the partitioning points P1 and P2 are different. In some embodiments, the identification of partitioning point P1 and/or P2 is determined by the partitioning block size and/or the partitioning depth. In some embodiments, the first block partitioning point P1 is predefined and fixed for all the video sequences.

In some embodiments, the first block partitioning point (or the first block size) is signaled at the high-level syntax, such as a sequence, frame, or slice level. In some embodiments, the second block partitioning point is explicitly signaled at the high-level syntax, such as a sequence, frame, or slice level. In some embodiments, the second block partitioning point is implicitly determined based on the luma block partitioning types and sizes.

In some embodiments, the determination of whether co-located chroma blocks share the first N1 level of block partitioning depends on the number of leaf nodes in co-located luma blocks. In some embodiments, if the number of leaf nodes in co-located luma block is more than N2, chroma will share the first N1 level of block partitioning types. For example, N2 is set to 4 and N1 is set to 1.

In some embodiments, at block partitioning point P2, chroma may only decide whether to share the same split flag with luma or not. A split flag can indicate whether a block is further split into more than one coded blocks or not.

In some embodiments, the determination on whether co-located chroma blocks share the same split flag depends on the number of leaf nodes in co-located luma blocks. For example, if the co-located luma blocks have more than N1 leaf coded blocks, chroma block will share the same split flag with luma block. Otherwise, a separate split flag is signaled for chroma block.

In some embodiments, at block partitioning point P2, chroma may decide whether to share the same split flag and partitioning direction with luma or not. In some embodiments, the determination on whether co-located chroma blocks share the same split flag partitioning direction with luma depends on the dominance partition direction in co-located luma blocks.

In some embodiments, when a super block or coding tree unit size is greater than or equal to one block size, a co-located chroma block is enforced to share the block partitioning with a luma block until the first block partitioning point, called P1. Starting from that partitioning point (or block size), chroma has separate block partitioning with its co-located luma block.

In some embodiments, when a super block or coding tree unit size is greater than or equal to one block size, co-located chroma block can either implicitly split using a predetermined or signaled split type or can share the block partitioning with luma until the first block partitioning point, called P1. In some embodiments, a signaled flag indicates whether chroma block is implicitly split or shares the block partitioning with luma until the first block partitioning point.

In some embodiments, the predetermined or signaled split types can include, but not limited to quad-tree, vertical 2-way, horizontal 2-way, uneven 4-way, vertical 3-way, horizontal 3-way.

Figure 6B:
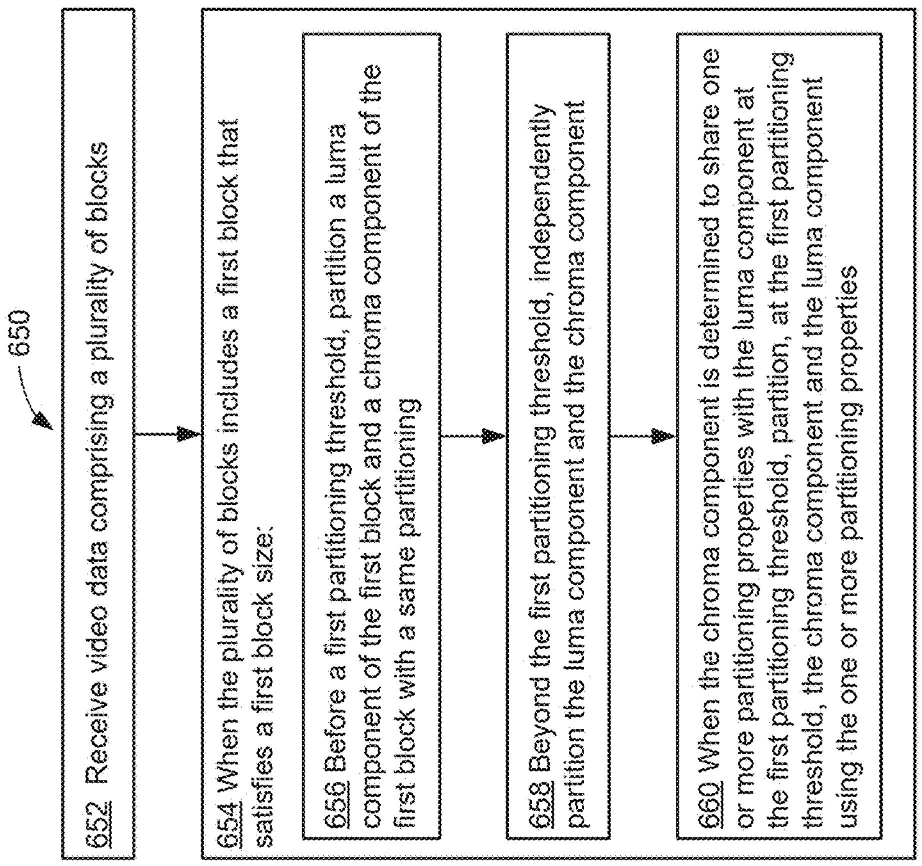
FIG. 6B illustrates an example video encoding process in accordance with some embodiments.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system. In some embodiments, the method 650 is performed by a same system as the method 600 described above.

The system receives (652) video data (e.g., a source video sequence) comprising a plurality of blocks (e.g., corresponding to one or more pictures). When the plurality of blocks includes a first block that satisfies (654) a first block size, the system, before a first partitioning threshold, partitions (656) a luma component of the first block and a chroma component of the first block with a same partitioning. the system, beyond the first partitioning threshold, independently partitions (658) the luma component and the chroma component. When the chroma component is determined to share one or more partitioning properties with the luma component at the first partitioning threshold, the system partitions (660), at the first partitioning threshold, the chroma component and the luma component using the one or more partitioning properties. As described previously, the encoding process may mirror the decoding processes described herein (e.g., partitioning procedures). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method (e.g., the method 600) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes: (i) receiving a video bitstream (e.g., a coded video sequence) comprising a plurality of blocks; and (ii) when (in accordance with a determination that) the plurality of blocks includes a first block that satisfies a first block size (e.g., with a height and/or width that is at least 64 samples, 128 samples, 256 samples, etc.): (a) before a first partitioning threshold (e.g., while a partitioning depth is less than the first partitioning threshold), partitioning a luma component of the first block and a chroma component of the first block with a same partitioning; (b) beyond the first partitioning threshold (e.g., while a partitioning depth is greater than the first partitioning threshold), independently partitioning the luma component and the chroma component; and (c) when the chroma component is determined to share one or more partitioning properties with the luma component at the first partitioning threshold, partitioning, at the first partitioning threshold (e.g., while a partitioning depth is equal to the first partitioning threshold), the chroma component and the luma component using the one or more partitioning properties. In some embodiments, the chroma component and the luma component share one or more partitioning properties between a first partitioning threshold and a second partitioning threshold, and the chroma component and the luma component have independent partitioning beyond the second partitioning threshold. For example, when a super block (or coding tree unit) size is greater than or equal to a first block size, a co-located chroma block is enforced to share the block partitioning with a luma block until the first block partitioning threshold (e.g., denoted P1). Starting from that partitioning threshold (or block size), chroma may have the flexibility to decide whether to share the same partitioning or not. Chroma may still share the same block partitioning type or partitioning direction or split flag with luma until the second block partitioning threshold (e.g., denoted P2). After that, chroma has separate block partitioning with its co-located luma block.

(A2) In some embodiments of A1, the method includes determining (deriving) the first partitioning threshold based on at least one of: a size of the first block (e.g., a height, width, area, or other size parameter), and a partitioning depth for the first block. For example, the identification of partitioning point P1 and/or P2 is determined based on the partitioning block size and/or the partitioning depth.

(A3) In some embodiments of A1, the first partitioning threshold is a predefined value (e.g., 128×128 or 64×64). For example, the first block partitioning threshold (point) is predefined and fixed for all the video sequences.

(A4) In some embodiments of A1, the method includes parsing a first indicator (e.g., a flag or syntax element) from the video bitstream, the first indicator indicating a value for the first partitioning threshold. For example, the first block partitioning threshold (and/or the first block size) is signaled in a high-level syntax, such as sequence/frame/slice level. In some embodiments, the second block partitioning point is explicitly signaled at the high-level syntax, such as sequence, frame, and slice level.

(A5) In some embodiments of A1 or A2, the method includes deriving the first partitioning threshold based on one or more of: a luma block partitioning type, and a luma block partitioning size. For example, the second block partitioning point is implicitly determined based on the luma block partitioning types and sizes. For example, if P1 and P2 are different, and the luma component is split into many subblocks (e.g., 16 or more subblocks), the chroma component will share at least one level of partitioning split.

(A6) In some embodiments of A1, A2, or A5, the first partitioning threshold is derived based on a number of leaf nodes in one or more luma blocks of the first block. For example, the determination on whether co-located chroma blocks share the first N1 level of block partitioning depends on the number of leaf nodes in co-located luma blocks. As an example, if the number of leaf nodes in co-located luma block is more than N2, the chroma component shares the first N1 level of block partitioning types (e.g., N2 is set to 4 and N1 is set to 1) with the luma component.

(A7) In some embodiments of any of A1-A6, the one or more partitioning properties comprise a split flag. For example, at block partitioning point P2, the system may determine whether the chroma component shares the same split flag with the luma component, the split flag indicating whether a block is further split into more than one coded block. As an example, the determination on whether co-located chroma blocks share the same split flag depends on the number of leaf nodes in co-located luma blocks.

(A8) In some embodiments of A7, the chroma component is determined to share a same split flag with the luma component at the first partitioning threshold when the luma component comprises at least a predefined threshold number of leaf blocks. When the luma component comprises less than the predefined threshold number of leaf blocks, the split flag for the chroma component is parsed from the video bitstream. For example, if the co-located luma blocks have more than N1 leaf coded blocks, the chroma block shares the same split flag with luma block. Otherwise, a separate split flag is signaled for chroma block.

(A9) In some embodiments of any of A1-A8, the one or more partitioning properties comprise a partitioning direction. For example, at block partitioning point P2, the system may determine whether the chroma component shares the same split flag and/or partitioning direction with the luma component.

(A10) In some embodiments of any of A1-A9, the method includes determining that the chroma component shares the one or more partitioning properties with the luma component at the first partitioning threshold based on a dominant partition direction of the luma component. For example, the determination on whether co-located chroma blocks share the same split flag partitioning direction with luma depends on the dominance partition direction in co-located luma blocks.

(B1) In another aspect, some embodiments include a method (e.g., the method 650) of video encoding. In some embodiments, the method is performed at a computing system (e.g., the server system 112) having memory and one or more processors. In some embodiments, the method is performed at a coding module (e.g., the coding module 320). The method includes: (i) receiving video data (e.g., a source video sequence) comprising a plurality of blocks (e.g., corresponding to one or more pictures); (ii) when the plurality of blocks includes a first block that satisfies a first block size: (a) before a first partitioning threshold, partitioning a luma component of the first block and a chroma component of the first block with a same partitioning; (b) beyond the first partitioning threshold, independently partitioning the luma component and the chroma component; and (c) when the chroma component is determined to share one or more partitioning properties with the luma component at the first partitioning threshold, partitioning, at the first partitioning threshold, the chroma component and the luma component using the one or more partitioning properties.

(B2) In some embodiments of B1, the method includes determining the first partitioning threshold based on at least one of: a size of the first block, and a partitioning depth for the first block.

(B3) In some embodiments of B1 or B2, the first partitioning threshold is a predefined value.

(B4) In some embodiments of B1 or B2, the method includes signaling a first indicator in a video bitstream, the first indicator indicating a value for the first partitioning threshold.

(B5) In some embodiments of any of B1-B4, the first partitioning threshold is derived (determined) based on a number of leaf nodes in one or more luma blocks of the first block.

(B6) In some embodiments of any of B1-B5, the one or more partitioning properties comprise one or more of: a split flag, and a partitioning direction.

(C1) In another aspect, some embodiments include a method of visual media data processing. In some embodiments, the method is performed at a computing system (e.g., the server system 112) having memory and one or more processors. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule. The video bitstream comprises a plurality of encoded blocks corresponding to the plurality of frames, the plurality of encoded blocks including a first block having a luma component and a chroma component. The format rule specifies that: (a) before a first partitioning threshold, the luma component and the chroma component are to be partitioned with a same partitioning; (b) beyond the first partitioning threshold, the luma component and the chroma component are to be independently partitioned; and (c) when the chroma component is determined to share one or more partitioning properties with the luma component at the first partitioning threshold, the chroma component and the luma component are to be partitioned at the first partitioning threshold using the one or more partitioning properties.

(C2) In some embodiments of C1, the format rule further specifies that the first partitioning threshold is based on at least one of: a size of the first block, and a partitioning depth for the first block.

(C3) In some embodiments of C1 or C2, the format rule further specifies that the first partitioning threshold is to be derived based on a number of leaf nodes in one or more luma blocks of the first block.

(D1) In another aspect, some embodiments include a method of video decoding. In some embodiments, the method is performed at a computing system (e.g., the server system 112) having memory and one or more processors. In some embodiments, the method is performed at a coding module (e.g., the coding module 320). The method includes (i) receiving a video bitstream (e.g., a coded video sequence) comprising a first block; (ii) before a first partitioning threshold, partitioning a luma component of the first block and a chroma component of the first block with a same partitioning; and (iii) beyond the first partitioning threshold, independently partitioning the luma component and the chroma component.

(D2) In some embodiments of D1, the luma component of the first block and the chroma component of the first block are partitioned with the same partitioning before the first partitioning threshold in accordance with a signaled indicator (e.g., a flag or syntax element) having a first value. For example, a signaled flag indicates whether the chroma block is implicitly split or shares the block partitioning with the luma block until the first block partitioning point. In some embodiments, the predetermined or signaled split types include one or more of: a quad-tree, a vertical 2-way, a horizontal 2-way, an uneven 4-way, a vertical 3-way, and a horizontal 3-way.

(D3) In some embodiments of D2, the luma component of the first block and the chroma component of the first block are partitioned with different partitioning before the first partitioning threshold in accordance with the signaled indicator having a second value, different than the first value. For example, when a super block or coding tree unit size is greater than or equal to a particular block size, the co-located chroma component can either implicitly split using a predetermined or signaled split type or can share the block partitioning with the luma component until the first block partitioning point, called P1.

(D4) In some embodiments of any of D1-D3, the method includes partitioning, at the first partitioning threshold, the chroma component and the luma component using the same partitioning.

(D5) In some embodiments of any of D1-D4, the first partitioning threshold is applied in accordance with the first block having a size that is greater than a predetermined size threshold. For example, when a super block or coding tree unit size is greater than or equal to one block size, the co-located chroma component is enforced to share the block partitioning with the luma component until the first block partitioning point, P1. Starting from that partitioning point (or block size), the chroma component has separate block partitioning with its co-located luma component.

(D6) In some embodiments of any of D1-D5, the method includes any of the aspects described above with respect to A1-A10.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A10, B1-B6, C1-C3, and D1-D6 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A10, B1-B6, C1-C3, and D1-D6 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:

receiving a video bitstream comprising a plurality of blocks; and when the plurality of blocks includes a first block that satisfies a first block size:

before a first partitioning threshold, partitioning a luma component of the first block and a chroma component of the first block with a same partitioning;

beyond the first partitioning threshold, independently partitioning the luma component and the chroma component;

when the chroma component is determined to share one or more partitioning properties with the luma component at the first partitioning threshold, partitioning, at the first partitioning threshold, the chroma component and the luma component using the one or more partitioning properties, wherein the one or more partitioning properties comprise one or more of a dominant partitioning direction and a number of leaf blocks, and wherein the chroma component is determined to share a same split flag with the luma component at the first partitioning threshold when the luma component meets the one or more partitioning properties; and when the luma component comprises less than a predefined threshold number of leaf blocks, parsing the split flag for the chroma component from the video bitstream.

2. The method of claim 1, further comprising determining the first partitioning threshold based on at least one of: a size of the first block, and a partitioning depth for the first block.

3. The method of claim 1, wherein the first partitioning threshold is a predefined value.

4. The method of claim 1, further comprising parsing a first indicator from the video bitstream, the first indicator indicating a value for the first partitioning threshold.

5. The method of claim 1, further comprising deriving the first partitioning threshold based on one or more of: a luma block partitioning type, and a luma block partitioning size.

6. The method of claim 1, wherein the first partitioning threshold is derived based on a number of leaf nodes in one or more luma blocks of the first block.

7. The method of claim 1, wherein the one or more partitioning properties comprise the split flag.

8. The method of claim 1, wherein the one or more partitioning properties comprise a partitioning direction.

9. A computing system, comprising:

control circuitry;

memory; and one or more sets of instructions stored in the memory and configured for execution by the control circuitry, the one or more sets of instructions comprising instructions for:

receiving video data comprising a plurality of blocks;

when the plurality of blocks includes a first block that satisfies a first block size:

before a first partitioning threshold, partitioning a luma component of the first block and a chroma component of the first block with a same partitioning;

beyond the first partitioning threshold, independently partitioning the luma component and the chroma component;

when the chroma component is determined to share one or more partitioning properties with the luma component at the first partitioning threshold, partitioning, at the first partitioning threshold, the chroma component and the luma component using the one or more partitioning properties, wherein the one or more partitioning properties comprise one or more of a dominant partitioning direction and a number of leaf blocks, and wherein the chroma component is determined to share a same split flag with the luma component at the first partitioning threshold when the luma component meets the one or more partitioning properties; and when the luma component comprises less than a predefined threshold number of leaf blocks, generating an indicator indicating the split flag for the chroma component, and signaling the indicator in the video bitstream.

10. The computing system of claim 9, wherein the one or more sets of instructions further comprise instructions for determining the first partitioning threshold based on at least one of: a size of the first block, and a partitioning depth for the first block.

11. The computing system of claim 9, wherein the first partitioning threshold is a predefined value.

12. The computing system of claim 9, wherein the one or more sets of instructions further comprising instructions for signaling a first indicator in a video bitstream, the first indicator indicating a value for the first partitioning threshold.

13. The computing system of claim 9, wherein the first partitioning threshold is derived based on a number of leaf nodes in one or more luma blocks of the first block.

14. The computing system of claim 9, wherein the one or more partitioning properties comprise one or more of a split flag, and a partitioning direction.

15. A non-transitory computer-readable storage medium storing one or more instructions and a video bitstream that is generated by a video encoding method, the one or more instructions, when executed by a computing system, cause the computing system to perform the video encoding method, the video encoding method comprising:

receiving video data comprising a plurality of blocks;

when the plurality of blocks includes a first block that satisfies a first block size:

before a first partitioning threshold, partitioning a luma component and chroma component of the first block with a same partitioning;

beyond the first partitioning threshold, independently partitioning the luma component and the chroma component;

when the chroma component is determined to share one or more partitioning properties with the luma component at the first partitioning threshold, the chroma component and the luma component are to be partitioned at the first partitioning threshold using the one or more partitioning properties, wherein the one or more partitioning properties comprise one or more of a dominant partitioning direction and a number of leaf blocks, and wherein the chroma component is determined to share a same split flag with the luma component at the first partitioning threshold when the luma component meets the one or more partitioning properties; and when the luma component comprises less than a predefined threshold number of leaf blocks, generating an indicator indicating the split flag for the chroma component, and signaling the indicator in the video bitstream.

16. The non-transitory computer-readable storage medium of claim 15, wherein the first partitioning threshold is based on at least one of: a size of the first block, and a partitioning depth for the first block.

17. The non-transitory computer-readable storage medium of claim 15, wherein the video bitstream further comprises a first indicator indicating a value for the first partitioning threshold.

18. The non-transitory computer-readable storage medium of claim 15, wherein the first partitioning threshold is to be derived based on a number of leaf nodes in one or more luma blocks of the first block.

19. The non-transitory computer-readable storage medium of claim 15, wherein the first partitioning threshold is a predefined value.

20. The non-transitory computer-readable storage medium of claim 15, wherein the one or more instructions further include instructions for signaling a first indicator in a video bitstream, the first indicator indicating a value for the first partitioning threshold.

* * * * *